June 28, 1938.  G. R. MEYERS  2,122,068
MEASURE
Filed March 16, 1935
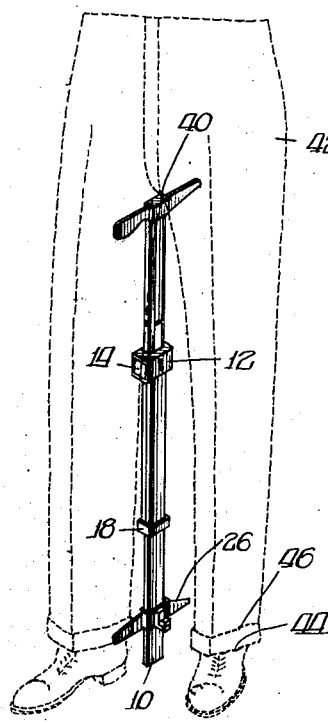
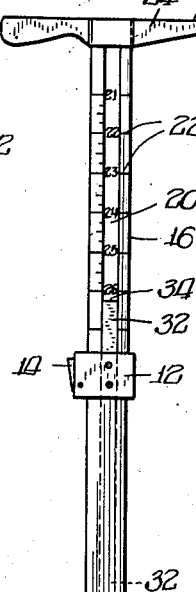
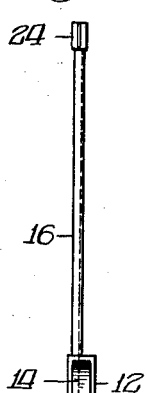
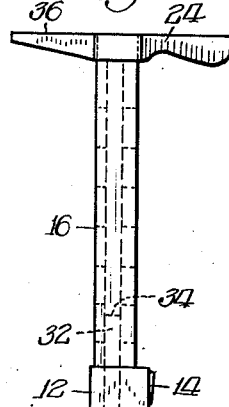
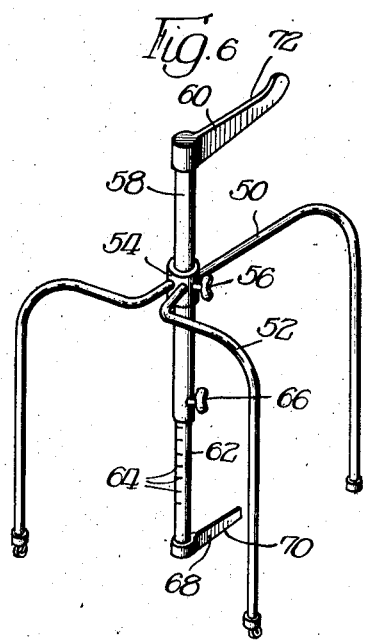
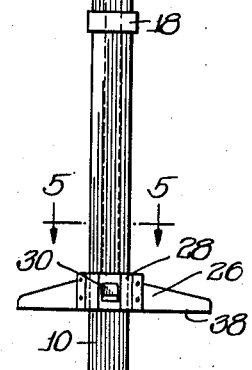
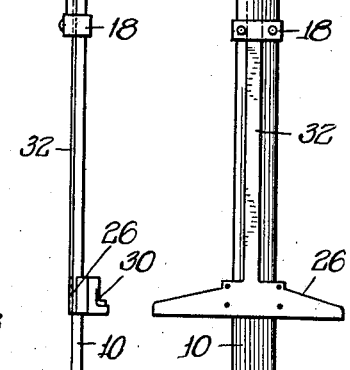
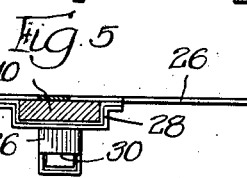
Inventor:
Gilbert R. Meyers, Patented June 28, 1938

2,122,068

UNITED STATES PATENT OFFICE 2,122,068

MEASURE

Gilbert R. Meyers, Fort Wayne, Ind., assignor to Trouzer Meter Inc., Fort Wayne, Ind., a corporation of Indiana Application March 16, 1935, Serial No. 11,380

7 Claims. (Cl. 33—2)

This invention pertains to a measuring device, and more particularly to a tailor's measure for determining desired lengths of wearing apparel.

An object of the invention is to provide a measuring device which will accurately determine the inseam measure of a pair of trousers.

Another object is to provide a measuring instrument for determining certain dimensions of wearing apparel of persons being fitted with said apparel.

Still another object of the invention is to provide means of obtaining measurements and the location of various parts of trousers to accurately fit the form of a wearer.

A further object is to provide an inexpensive measuring device which can simply and accurately determine the measurements of wearing apparel from a fixed support or from a reference point which may be fixedly set.

With these and various other objects in view, the invention may consist of certain novel features of construction and operation as will be more fully described and particularly pointed out in the specification, drawing and claims appended hereto.

In the drawing, which illustrates embodiments of the device and wherein like reference characters are used to designate like parts—

Figure 1 is a perspective elevation of one form of the measuring device showing the same in position to determine the inseam length of a pair of trousers;

Figure 2 is a side elevation of the measuring device illustrated in Figure 1 showing the same set for measuring operation;

Figure 3 is an end elevation of the device illustrated in Figure 2;

Figure 4 is a side elevation of the opposite side of the device as illustrated in Figure 2;

Figure 5 is a sectional plan view taken substantially in the plane as indicated by the line 5—5 of Figure 2;

Figure 6 is a perspective elevation of a modified form of measuring device.

Referring first of all more particularly to the measuring device illustrated in Figures 1 to 5 inclusive, the device consists essentially of an elongated base or lower measuring member 10 which may be formed of any convenient length and any suitable material. This base or lower measuring member is provided adjacent the upper end thereof with a guiding and locking housing 12 in which there is provided a friction lock (not shown), said lock being controlled by the pivoted plunger or locking lever 14.

The housing 12 forms a guide for the upper slidable measuring member 16 which extends through the housing 12 and is provided adjacent the lower end thereof with a guide member 18 slidably embracing the base or lower measuring member 10. The measuring member 16 is provided with a channel 20 extending substantially the length thereof and being graduated to provide measuring indicia 22, the upper end of said measuring member being provided with the head or crotch arm 24.

The base or lower measuring member 10 is likewise provided with a slidable crosshead, gauge member, or cuff arm 26, said arm being provided with a guiding and locking housing 28 embracing the member 10 and provided with the friction lock 30. The member 26 is slidably mounted on the base or lower measuring member 10 and is provided with the slide 32 extending upwardly and disposed to move in the channel 20, and preferably substantially wholly within said channel.

As the device illustrated is particularly for determining a seam measurement, the length of the slide 32 is determined so that when the upper edge 34 of said slide is opposite a certain indice, said indicia will indicate the distance apart the upper edge 36 of the head 24 is from the lower edge 38 of the head or selecting member 26.

In order then, to determine the inner seam measure of a pair of trousers, that is, the distance from the crotch to the lower edge of the cuff, the one making the measurement places the foot of the base or lower measuring member 10 on a stationary support or datum plane, as the floor. With the indicia properly located this datum plane may, if desired, determine any point on the base or lower measuring member. The measuring member 16 is then elongated or pulled upwardly by depressing the plunger 14 until the upper edge 36 of the head 24 is disposed at a comfortable position in the crotch 40 of the trousers 42. The measurer then depresses or releases the lock 30 and moves the member 26 to the selected position where the bottom edge 38 of the member is at its proper position to determine the desired lower edge 44 of the cuff 46. The whole device may then be removed and the upper edge 34 of the slide determines the reading which gives the proper inseam length of the trousers.

In the modification illustrated in Figure 6, the stand 50 is employed, consisting essentially of a plurality of legs 52 (three shown, forming substantially a tripod), extending to engage a fixed support such as the floor. The frame 50 is provided with the collar 54 having a locking thumb screw 56 thereon, or a spring pressed lock as contemplated in the modification illustrated in Figure 1. The upper tubular member 58 extends through the collar 54, and is provided with the head 60 which corresponds to the member 24. The lower slidable measuring member 62 is slidably mounted in the member 58 and is provided with the indicating graduations 64 thereon, the member being locked in position with respect to the member 58 by means of the thumb screw 66 or frictional locking member as before contemplated. The member 62 is likewise provided with the measuring head 68 for determining the lower edge of the cuff, the graduations 64 being such that the upper graduation will determine the distance apart that the lower edge 70 of member 69 is from the upper edge 72 of the member 60, thus making possible the determination measurements as inner seam measurements.

Of course, while these devices are shown as adapted for use in inseam measure of a pair of trousers, they may also determine any length, or may determine the outer seam length of any other garment, as a skirt, or the knee length of a skirt or of trousers. As the device is fixed by the locking means after the measure is taken, there is no danger of taking inaccurate measurements as where a tape must be held in position and read on the purchaser of the apparel.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a device of the character described, the combination of a base member, a measuring member mounted on said base member and movable to a selected position, said measuring member having a channel therein, a gauge member movably mounted on said base member and said measuring member, one of said members having measuring indicia thereon, and means on said gauge member disposed in said channel whereby the distance between said gauge member and a portion of said measuring member may be determined.

2. In a device of the character described, the combination of a base member, a measuring member mounted on said base member and movable to a selected position, said measuring member having measuring indicia thereon, a gauge member movably mounted on said base member and provided with means movable along said indicia whereby the distance between said selecting member and a portion of said measuring member may be determined, and means for releasably locking said base member, said measuring member and said gauge member in selected positions.

3. In a device of the character described, the combination of a base member, a measuring member mounted on said base member and movable to a selected position, a gauge member movable with respect to said base member and said measuring member, one of said first two named members having measuring indicia thereon cooperating with said gauge member to indicate the distance between said gauge member and a portion of the other of said first two named members, and means for releasably locking said base member, said measuring member and said gauge member in selected positions.

4. In a device of the character described, the combination of a base member, a measuring member mounted on said base member and movable to a selected position, said measuring member having a channel therein, a gauge member movably mounted on said base member and said measuring member, one of said members having measuring indicia thereon, means on said gauge member disposed in said channel whereby the distance between said gauge member and a portion of said measuring member may be determined, and means for releasably locking said base member, said measuring member and said gauge member in selected positions.

5. In a device of the character described, the combination of a base member, a measuring member mounted on said base member and movable to a selected position, said measuring member having a measuring head thereon, said measuring member having measuring indicia thereon, a gauge member having a measuring head thereon and being movably mounted on said base member and being provided with means movable along said indicia whereby the distance apart of pre-selected portions of said heads may be determined, and means for releasably locking said base member, said measuring member and said gauge member in selected positions.

6. In a device of the character described, the combination of a base member, a plurality of relatively movable members movably mounted on said base member and having cooperating means indicating directly the total distance between portions of said movable members when in any selected position, and locking means for releasably locking said members in selected position, said base member providing a datum plane when said device is in use for establishing the proper positioning of one of said relatively movable members in respect thereto.

7. A measuring device comprising telescopically arranged measuring members, one of said members serving as a base member and the other member having a portion for establishing a position with respect to a datum plane for the base member, means for locking said members in any desired adjusted position, a gauge member movably mounted with respect to the other of said members, and means for indicating directly the total distance from said gauge member to the portion of said first-named member, said means comprising indicia on one of said measuring members and means cooperating with said indicia and movable in accordance with the movement of said gauge member.

GILBERT R. MEYERS.